Oct. 12, 1926.
E. J. MARTEL
1,603,089
AUTOMOBILE LOCK
Filed April 28, 1924
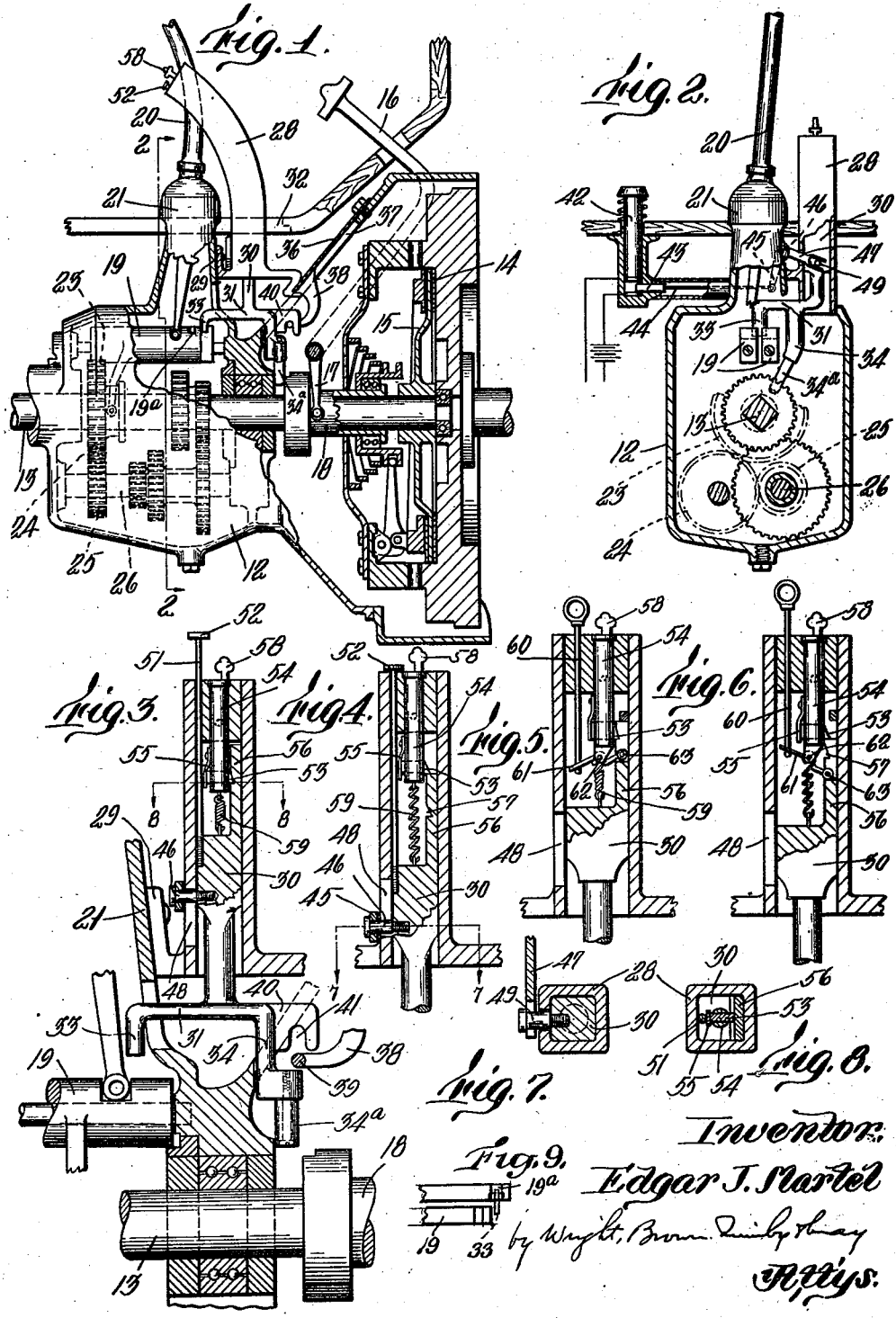

Patented Oct. 12, 1926.

1,603,089

UNITED STATES PATENT OFFICE.

EDGAR J. MARTEL, OF LACONIA, NEW HAMPSHIRE.

AUTOMOBILE LOCK.

Application filed April 28, 1924. Serial No. 709,422.

This invention has for its object chiefly to provide means associated with an automobile transmission for locking an element or elements of the transmission in such manner that the transmission will cause such opposition to the movement of the vehicle on its own wheels that it will not be practicable for a thief to tow or push the vehicle without detection any considerable distance from the location where it is left by the owner.

I accomplish this and other related objects of the improvements hereinafter described and claimed.

Of the accompanying drawings forming a part of this specification,—

Figure 1 shows partly in section and partly in elevation an automobile transmission and locking means embodying the invention.

Figure 2 is a section on line 2—2 of Figure 1.

Figure 3 is a view on a larger scale similar to a portion of Figure 1, showing the locking means inoperatively adjusted.

Figure 4 is a view similar to a portion of Figure 3 showing portions of the locking means as they appear when the locking means is operatively adjusted.

Figures 5 and 6 are views similar to Figures 3 and 4 showing a modification.

Figure 7 is a section on line 7—7 of Figure 4.

Figure 8 is a section on line 8—8 of Figure 3.

Figure 9 is a fragmentary plan view of the ends of the shifter rods in the transmission mechanism, indicating the locking means in locking position.

The same reference characters indicate the same parts in all the figures.

I have selected for purposes of illustration the transmission employed in a well known type of motor vehicle, without intending to limit myself to the specific mechanism shown.

Figure 1 shows the transmission case 12, the main transmission shaft 13, the usual clutch comprising the fixed member 14 and the movable member 15 slidable on and engaged with the transmission shaft, and movable by the clutch lever or pedal 16 through the clutch yoke 17 and the slidable clutch sleeve 18. The transmission also includes the shifter rods 19 movable by the gear shaft lever 20 supported by the hollow standard 21 on the transmission case.

I provide means for locking the shifter rods 19 in position to cause opposition, by the transmission, to movement of the vehicle by force externally applied when the car is supported by its own wheels which must turn when the vehicle is moved. In this instance said locking means is adapted to lock the shifter rods when the transmission is "in reverse," the sliding reverse gear 23 being engaged through the intermediate gear 24 with the gear 25, which is one of the gears on the usual counter shaft 26. The locking means may, however, be adapted and arranged to lock the transmission in neutral or "in gear", that is to say in its adjustment for the forward propulsion of the vehicle by its own power and at either of the speeds usually provided for.

In the embodiment of the invention here shown I provide locking means for locking the movable member 15 of the clutch in operative engagement with the fixed member 14, locking means for locking the starter switch in an inoperative position, and locking means for locking the movable cover of the opening provided in the transmission case, so that said cover cannot be removed to permit access to and tampering with the clutch locking mechanism.

The several locking means are simultaneously operable so that the elements they control may be simultaneously locked by the driver of the vehicle.

The preferred mechanism embodying the locking means includes a hollow post or guide 28 fixed to the transmission case, as by an ear 29 on the guide bolted or riveted to the hollow standard portion 21 of the case, and a plunger 30 movable in the guide and provided with a head 31. The guide 28 extends through the usual floor 32 and the plunger projects below the guide so that the head 31 is vertically movable. The head is provided with a stop arm 33 adapted to be projected as shown by Figures 1 and 2 into the path of the shifter rods 19, and prevent movement of said rods to the right from the position shown by Figure 1, thus locking the rods with the transmission "in reverse." For this purpose, the rods 19 may each have a slot 19$^a$ cut across their upper portions. When either rod is retracted, as to the left in Figure 1, the stop arm 33 may be depressed, entering the slot of the rod remaining in neutral position and blocking the return of the retracted rod to neutral position. The arrangement may be such, however, that the arm 33 will lock the shifter rods when the transmission is "in gear" at either speed for the forward propulsion of the vehicle, or in neutral.

The head 31 is provided with a stop arm 34 adapted to be projected as shown by Figures 1 and 2 into the path of the clutch sleeve 18 and prevent movement of said sleeve to the left from the position shown by Figure 1, thus locking the clutch in engagement, and preventing it from being thrown off. The arm 34 preferably includes an anti-friction roll 34ª which is the portion of the arm contacting with the clutch sleeve. When the plunger 30 is raised the arms 33 and 34 are inoperative, as shown by Figure 3.

The usual cover plate 36 covering the opening 37 provided in the transmission case for access to the interior of the case, is provided, in accordance with my invention, with an arm 38 having a finger 39 (Figure 3). The head 31 is provided with a stop formed as a slotted ear 40, the slot 41 of which is adapted to engage the finger 39, as shown by Figure 1, when the plunger and head are depressed, so that the cover plate is locked and cannot be removed or displaced to permit the insertion into the transmission case of a tampering device for unlocking or releasing the clutch member 15. The depression of the plunger to lock the elements above described may also cause the locking of the starter switch 42 in its inoperative position as next described.

A locking device or stop 43 (Figure 2) is movable in the path of the switch 42 and is connected by a rod 44 with an arm 45 of a bell crank lever which is fulcrumed at 46 to the standard 21. The other arm 47 of said lever projects through a slot 48 in the guide 28 and is slotted to engage a stud 49 on the plunger 30. When the plunger is depressed the stop 43 is projected under the starter switch 42 and prevents the depression of the latter. When the plunger is raised the stop 43 is withdrawn from the path of the switch.

The plunger 30 is manually movable by the driver, so that it may be depressed and raised, to simultaneously lock and release the several elements. The plunger may be automatically locked in its depressed position by means permitting it to be manually unlocked, and spring means may be provided for raising the plunger when it is unlocked. As shown by Figures 3 and 4 the plunger is provided with a push and pull rod 51 which projects above the guide 28 and has a head or handle 52 enabling the driver to depress the plunger by pushing the rod, and to raise the plunger by pulling the rod.

When the plunger is depressed it is locked by a bolt 53 carried by a stud 54 which is adapted to be turned in the guide and prevented from endwise movement therein. The bolt is movable in a slot in the stud 54 and is yieldingly projected by a spring 55. The plunger 30 is cut away at its upper portion to form a tongue 56 having a notch 57. When the plunger is depressed the bolt 53 engages the upper end of the tongue, as shown by Figure 4, and locks the plunger in its depressed position. The stud 54 is adapted to be turned by a key 58 removably inserted in a slot or keyhole formed in the stud. When the stud is thus turned the bolt 53 is moved out of engagement with the tongue 56, so that a spring 59 connecting the plunger with the stud 54, is permitted to raise the plunger, until the bolt 53 springs into the notch 57 in the tongue, as shown by Figure 3.

In the modification shown by Figures 5 and 6 a rod 60 is adapted to be pulled upward to depress the plunger and pushed downward to raise the plunger, the rod being engaged with a lever 61 pivoted at 62 to ears on the stud 54, and fulcrumed at 63 on the tongue 56. It will now be seen that when the plunger is depressed and locked it cannot be released and raised until the key 54 is inserted and turned.

It will also be seen that I have provided locking means for locking the transmission gears and locking means for the locking of the movable clutch member when it is in engagement or performing its usual function. These locking means effectually prevent successful extended movement of the vehicle by power externally applied.

In some cases it may be desirable to elongate and curve the guide 28 as indicated in Figure 1 for the convenience of the driver in manipulating the key 58 and the handle 52, the elongation and curvature being such that the upper end of the guide 28 is between the gear shift lever 20 and the emergency lever (not shown). The plunger and the rod will, of course, be correspondingly curved. The rod may be made in sections connected by a hinge or joint.

It will be observed that the locking arm 33 engages the shifter rods or shifter fork rods 19 at a point forward of the gear shift lever 20, said rods being lengthened or extended forward to cooperate with the locking arm. This is a feature in transmission locks which is new with me.

I claim:

1. In a motor vehicle, in combination, transmission and clutch mechanism including a shifter rod and a movable clutch member; and locking means comprising a guide fixed below the floor of the vehicle and projecting upward above the floor of the vehicle, so that its upper end is out of reach of the driver's foot, a plunger manually movable in said guide, stop devices carried by the plunger adapted to simultaneously engage the shifter rod and the movable clutch member, to confine the same when the plunger is depressed, and means for locking the plunger to the guide when the stop devices are operative.

2. In a motor vehicle, in combination, transmission and clutch mechanism including a shifter rod and a movable clutch member, said mechanism being inclosed in a case having an opening, and an opening cover provided with a locking member; and locking means comprising a guide fixed to and projecting upward from the case through and above the floor, so that its upper end is out of reach of the driver's foot, a plunger manually movable in said guide, stop devices carried by the plunger within the case, adapted to simultaneously engage the shifter rod, the movable clutch member, and the locking member of the cover to confine the same when the plunger is depressed, and means for locking the plunger to the guide, when said devices are operative, the cover of the case opening, when locked, preventing access to the stop devices.

3. In a motor vehicle, in combination, transmission and clutch mechanism including a shifter rod and a movable clutch member having a sleeve, said mechanism being enclosed in a case having an opening and an opening cover provided with a locking member, and locking means comprising a guide fixed to and projecting upward from the case through and above the floor, a plunger manually movable in said guide and provided with a head having a stop adapted to engage the forward end of the shifter rod, a stop adapted to engage the rear end of the clutch sleeve, and a stop adapted to engage the locking member of the cover, said stops being rendered simultaneously operative when the plunger is depressed, and means for locking the plunger to the guide when the stops are operative.

4. In a motor vehicle, in combination, transmission and clutch mechanism including a shifter rod and a movable clutch member having a sleeve; and locking means comprising a guide fixed below the floor of the vehicle and projecting upward above the floor of the vehicle, so that its upper end is out of reach of the driver's foot, a plunger manually movable in said guide, stop devices carried by the plunger adapted to simultaneously engage the shifter rod and the sleeve of the movable clutch member, to confine the same when the plunger is depressed, and plunger-locking means including a stud adapted to be rotated by a key in a fixed bearing in the guide, and a spring-pressed bolt carried by and movable in the stud and adapted to be engaged with the plunger to lock the same in a depressed position, by a rotation of the stud.

5. In a motor vehicle having a motor starting device, in combination, transmission and clutch mechanism including a shifter rod and a slidable clutch member having a sleeve; and locking means comprising a guide, a plunger manually movable in said guide, stop devices carried by the plunger adapted to simultaneously engage said shifter rod and said sleeve, and means operatively connected to said plunger to lock said motor starting device when the shifter rod and sleeve are engaged.

In testimony whereof I have affixed my signature.

EDGAR J. MARTEL.